United States Patent
Sekine (10) Patent No.: US 8,982,234 B2
(45) Date of Patent: Mar. 17, 2015

(54) INFORMATION PROCESSING APPARATUS AND METHOD

(71) Applicant: Canon Kabushiki Kaisha, Tokyo (JP)

(72) Inventor: Hisato Sekine, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 89 days.

(21) Appl. No.: 13/913,837

(22) Filed: Jun. 10, 2013

(65) Prior Publication Data

US 2013/0342737 A1  Dec. 26, 2013

Related U.S. Application Data

(63) Continuation of application No. 13/300,218, filed on Nov. 18, 2011, now Pat. No. 8,482,627.

(30) Foreign Application Priority Data

Nov. 26, 2010 (JP) ................................ 2010-264217

(51) Int. Cl.
| | |
|---|---|
| H04N 5/228 | (2006.01) |
| H04N 5/217 | (2011.01) |
| G06K 9/40 | (2006.01) |
| H04N 1/407 | (2006.01) |
| H04N 5/232 | (2006.01) |
| H04N 5/357 | (2011.01) |
| G06T 5/00 | (2006.01) |
| G06T 5/20 | (2006.01) |

(52) U.S. Cl.
CPC ........... *H04N 5/217* (2013.01); *H04N 5/23209* (2013.01); *H04N 5/3572* (2013.01); *G06T 5/003* (2013.01); *G06T 5/20* (2013.01); *G06T 2207/10024* (2013.01); *G06T 2207/20012* (2013.01)
USPC .................. 348/222.1; 348/241; 348/208.99; 382/255; 382/254; 358/3.27

(58) Field of Classification Search
CPC ......... H04N 5/228; H04N 5/217; H04N 9/73; H04N 9/64; H04N 5/208; H04N 5/232; H04N 5/225; H04N 1/407; H04N 1/40; G06K 9/40; G03F 3/108
USPC ......... 348/222.1, 223.1, 241, 208.12, 208.13, 348/246, 248, 252, 251, 256, 335, 352; 382/254, 255, 260, 261, 262, 263, 264, 382/274; 358/3.04, 3.27, 461, 520
See application file for complete search history.

(56) References Cited

U.S. PATENT DOCUMENTS

| | | | | |
|---|---|---|---|---|
| 7,031,548 | B2 * | 4/2006 | Baggs | 382/261 |
| 8,482,627 | B2 * | 7/2013 | Sekine | 348/222.1 |
| 8,754,957 | B2 * | 6/2014 | Kano | 348/222.1 |

(Continued)

*Primary Examiner* — Tuan Ho
*Assistant Examiner* — Marly Camargo
(74) *Attorney, Agent, or Firm* — Canon U.S.A., Inc. IP Division (57) ABSTRACT

An image processing method, for correcting a blur a due to an optical system of an image capturing apparatus, the image processing method including, storing a plurality of representative filters in a memory, selecting a subset of representative filters from the plurality of representative filters based on a pixel position of a pixel of interest in an image, applying each of the selected representative filter to a pixel value of the pixel of interest, and correcting the pixel value of the pixel of interest based on (a) a result of the application of filters, and (b) the pixel position of the pixel of interest.

10 Claims, 13 Drawing Sheets

(56) References Cited

U.S. PATENT DOCUMENTS

2008/0253650 A1* 10/2008 Kuniba .................. 382/167
2009/0316024 A1* 12/2009 Noh ...................... 348/252
2010/0194933 A1* 8/2010 Sasaki .................... 348/241
2011/0285871 A1* 11/2011 Sakai ..................... 348/229.1

* cited by examiner

| LENS TYPE | CAMERA TYPE | APERTURE VALUE | FOCAL LENGTH [mm] | SUBJECT DISTANCE [mm] | RESTORATION FILTER DB ADDRESS |
|---|---|---|---|---|---|
| LENS A | CAMERA 1 | 2.8 | 35 | ∞ | ADDRESS 0x000A128EE-1 |
| | | | | 10000 | ADDRESS 0x000A128EE-2 |
| | | | | : | |
| | | | 40 | ∞ | ADDRESS 0x000A12825-1 |
| | | | | : | |
| | | | : | : | : |
| | | 3.5 | 35 | ∞ | ADDRESS 0x000A135EE-1 |
| | | | | 10000 | ADDRESS 0x000A135EE-2 |
| | | | | : | |
| | | | 40 | ∞ | ADDRESS 0x000A13525-1 |
| | | | | : | |
| | | | : | : | : |
| | | : | : | : | : |
| | CAMERA 2 | 2.8 | 35 | ∞ | ADDRESS 0x000A228EE-1 |
| | | | | 10000 | ADDRESS 0x000A228EE-2 |
| | | | | : | |
| | | | 40 | ∞ | ADDRESS 0x000A22825-1 |
| | | | | : | |
| | | | : | : | : |
| | | : | : | : | : |
| LENS B | : | : | : | : | : |
| | : | : | : | : | : |

FIG. 6B

→ ADDRESS 0x000A128EE-1

| FILTER POSITION ID | HORIZONTAL TAP COUNT | VERTICAL TAP COUNT | FILTER COEFFICIENT | | | | | | |
|---|---|---|---|---|---|---|---|---|---|
| | | | 1 | 2 | 3 | ... | 63 | 64 | ... |
| 1 | 8 | 8 | 0.00009 | 0.00011 | 0.00014 | ... | 0.00011 | 0.00009 | |
| 2 | 8 | 8 | 0.00010 | 0.00012 | 0.00015 | ... | 0.00012 | 0.00015 | |
| ... | ... | ... | ... | ... | ... | ... | ... | ... | |
| 45 | 8 | 8 | 0.00009 | 0.00011 | 0.00014 | ... | 0.00011 | 0.00009 | |

FIG. 12

INFORMATION PROCESSING APPARATUS AND METHOD

INFORMATION PROCESSING APPARATUS AND METHOD

This application is a continuation of application Ser. No. 13/300,218, filed on Nov. 18, 2011, which claims the benefit of Japanese Patent Application No. 2010-264217, filed Nov. 26, 2010, which are hereby incorporated by reference herein in their entirety.

BACKGROUND OF THE INVENTION

1. Field of the Invention

The present invention relates to an image processing apparatus, and more particularly, relates to an image processing apparatus and method for correcting a blur due to aberration of an optical system, such as an image capturing apparatus.

2. Description of the Related Art

In the field of an image capturing apparatus, such as digital cameras, it is known that an aberration of an optical system causes an image deterioration such as image blur. Japanese Patent Application Laid-Open No. 2001-197354 and Japanese Patent No. 3,532,368 discuss image restoration techniques to restore this image deterioration using Point Spread Function (PSF) of the optical system.

An aberration characteristic of an optical system varies depending on pixel positions in an image. Therefore, it is required to change a restoration operation depending on pixel positions in an image. Japanese Patent Application Laid-Open No. 2001-197354 discusses an image restoration technique where different filters are applied to all pixels in an image. This image restoration technique provides preferred filters for every pixel position in an image. However, a vast amount of computational cost is required to generate the filters for all pixel positions in an image using Fourier transform. Moreover, large scale memory equipment is needed to store the generated filters.

Japanese Patent No. 3,532,368 discusses another image restoration technique where (a) an image is divided into a plurality of regions in a concentric fashion, and (b) different filters are applied to each of the divided regions. This is because the aberration characteristic of an optical system is symmetric with respect to an optical center of an image. Since a common filter is used in respective divided regions, the computational cost to generate filters and the memory size to store the filters can be reduced. However, this technique may not deal with the variation of the aberration characteristic over the image since constant filters (common filters) are applied to each region. Moreover, artifacts are generated at the border between the divided regions.

SUMMARY OF THE INVENTION

In light of the above, what is needed are a better technique to generate preferred filters for each pixel position in an image, while reducing the computational cost and the memory size.

Thus, in an example embodiment described herein, an image processing method for correcting a blur attribute to an optical system of an image capturing apparatus, the image processing method comprising storing a plurality of representative filters in a memory, selecting a subset of representative filters from the plurality of representative filters based on a pixel position of a pixel of interest in an image, applying each of the selected representative filter to a pixel value of the pixel of interest, and correcting the pixel value of the pixel of interest based on (a) a result of the application of filters, and (b) the pixel position of the pixel of interest.

This brief summary has been provided so that the nature of this disclosure may be understood quickly. A more complete understanding can be obtained by reference to the following detailed description and to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features and aspects of the invention will be described in detail below with reference to the drawings.

[First Exemplary Embodiment]

Figure 1:
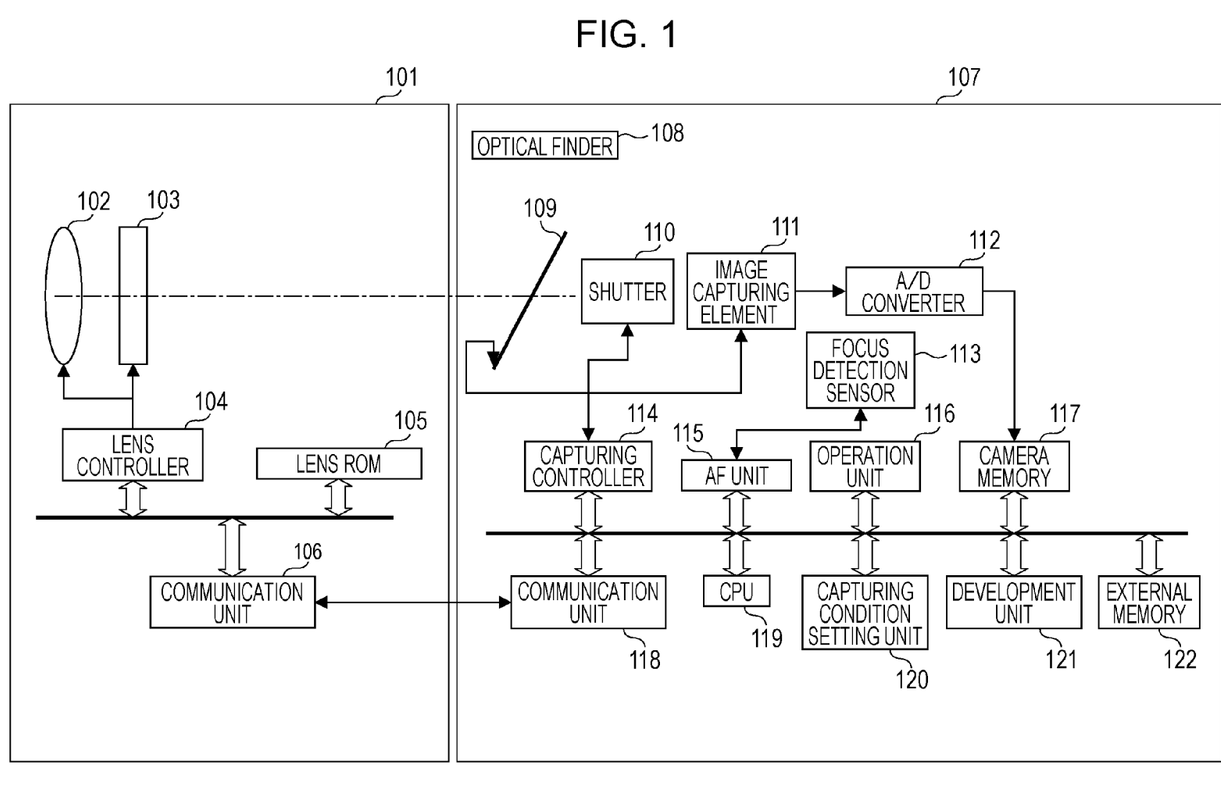
FIG. 1 is a block diagram illustrating an image capturing apparatus according to a first exemplary embodiment.

FIG. 1 is a block diagram illustrating an image capturing apparatus according to a first exemplary embodiment. In the first exemplary embodiment, the image capturing apparatus is a digital camera. A lens unit 101 includes a lens 102, an aperture diaphragm 103, a lens controller 104, a lens ROM 105, and a communication unit 106. The lens controller 104 controls the lens 102 and the aperture diaphragm 103. The lens ROM 105 stores data including correction filters (hereinafter referred to as restoration filters). The communication unit 106 controls communication regarding control commands for the lens 102 and the aperture diaphragm 103, and data for the restoration filters.

A camera 107 includes an optical finder 108, a half mirror 109, a shutter 110, an image capturing element 111 such as a charge-coupled device (CCD) and a complementary metal-oxide semiconductor (CMOS), an A/D converter 112, and a focus detection sensor 113. Furthermore, the camera 107 includes a capturing controller 114, an AF unit 115, an operation unit 116, a camera memory 117, a communication unit 118, a central processing unit (CPU) 119, a capturing condition setting unit 120, a development unit 121, and an external memory 122.

The half mirror 109 reflects light from a subject of capturing to the optical finder 108. The capturing controller 114 controls the shutter 110, the image capturing element 111, and the lens 110. AF unit 115 determines an amount of focus based on a detection result obtained by the focus detection sensor 113. The operation unit 116 receives a user operation by a user to generate user commands. The camera memory 117 stores image data converted by the A/D converter, a computer program to control the camera 107, various parameters, restoration filters and the like. The communication unit 118 conducts data communication with the lens unit 101. CPU 119 executes various processes in the camera 107 and the lens 101. The capturing condition setting unit 120 sets various parameters. Using the image data stored in the camera memory 117, the development unit 121 executes various processes such as development process, white balancing process, restoration process, sharpness enhancement process, color conversion process. The external memory 122 can be a compact flash Memory™ and an SD memory card. The functions of the development unit 121, the capturing controller 114, AF unit 115, the communication unit 118, operation unit, and other units can be executed by CPU 119.

Figure 2:
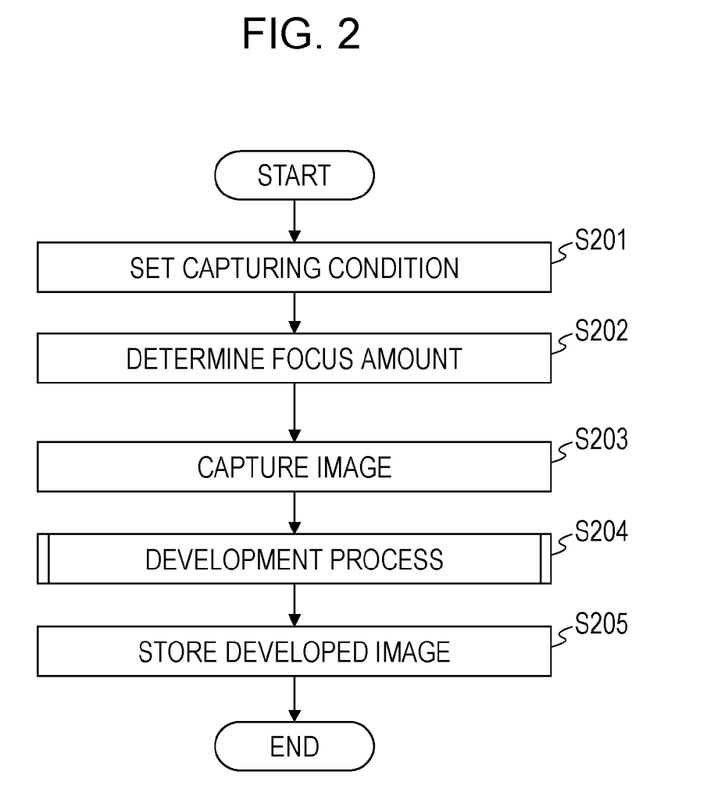
FIG. 2 is a flowchart illustrating an image process according to a first exemplary embodiment.

FIG. 2 is a flowchart illustrating an image process according to the first exemplary embodiment. First, in step S201, the capturing condition setting unit 120 sets capturing conditions. The capturing conditions are an aperture value, a focal length, a subject distance, a shutter speed, ISO sensitivity setting and the like. The set capturing conditions can be obtained via the operation unit 116 or can be set based on a sensing result acquired by a sensor (not shown) in the camera 107.

Next, in step S202, the AF unit 115 determines the amount of focus based on the detection result obtained by the focus detection sensor 113. Next, in step S203, CPU 110 controls the lens controller 104 and the capturing controller 114 according to the capturing conditions set in step S201 and the amount of focus determined in step S202 to capture an image of a subject. Electronic signals obtained by the image capturing element 111 are converted to digital signals in the A/D converter. The converted digital signals are stored in the camera memory 117 as RAW image data. The RAW image data is associated with tag information including lens type information, camera type information, capturing conditions, the amount of focus and the like. Next, in step S204, the development unit 121 conducts development process of the stored RAW image data. Finally, in step S205, the developed image data is stored associated with the tag information in the camera memory 117 or the external memory 122. The developed image data can be sent to another system over a network without storing.

<Development Process>

Figure 3:
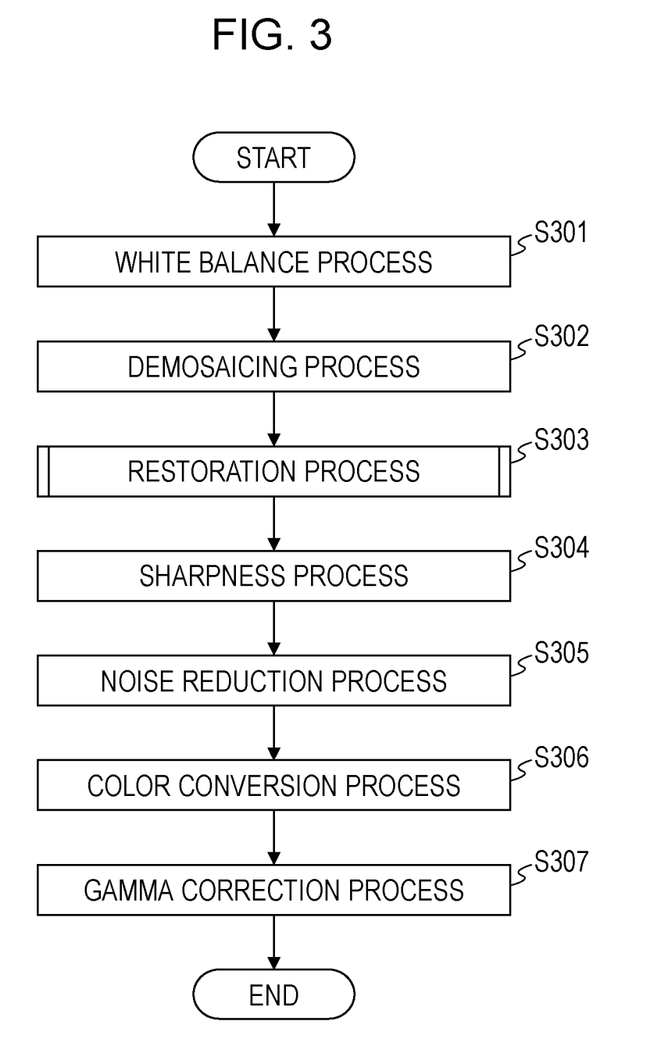
FIG. 3 is a flowchart illustrating a development process according to a first exemplary embodiment.

FIG. 3 is a flowchart illustrating a development process in step S204. Each step is conducted by the development unit 121 in collaboration with CPU 119 and other units. First, in step S301, the development unit 121 conducts a white balance process for the RAW image data stored in the camera memory 117. Next, in step S302, the development unit 121 conducts a demosaicing process for the white-balanced image data. Next, in step S303, the development unit 121 conducts a restoration process for the demosaiced image data to restore an image blur due to the aberration of the optical system. Next in step S304, the development unit 121 conducts a sharpness process for the restored image data. Next, in step S305, the development unit 121 conducts a noise reduction process for the sharpened image data. Next, in step S306, the development unit 121 conducts a color conversion process for the noise-reduced image data. Finally, in step S307, the development unit 121 conducts a Gamma correction process.

The processing order from step S301 to step S307 can be interchanged. For instance, the demosaicing process in step S302 can be conducted after the restoration process in step S303.

<Restoration Process>

Figure 4:
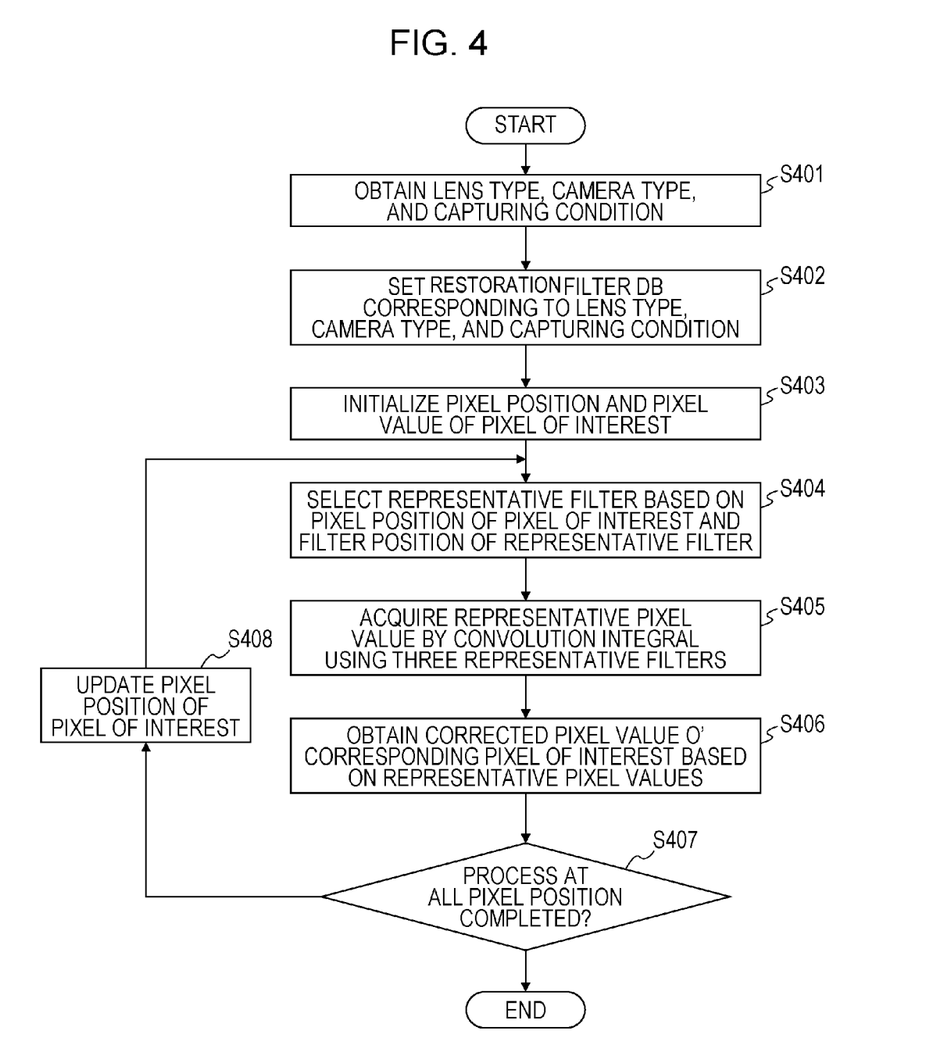
FIG. 4 is a flowchart illustrating a restoration process according to a first exemplary embodiment.

FIG. 4 is a flowchart illustrating a restoration process in step S303. The restoration process in the first exemplary embodiment is performed by applying a restoration filter to a pixel of interest and a peripheral pixel adjacent to the pixel of interest using a convolution integral. Each step is conducted by the development unit 121 in collaboration with CPU 119 and other units.

In the first exemplary embodiment, the restoration process is conducted for each color component (e.g. Red, Green, and Blue components). However, the first exemplary embodiment is not limited to this arrangement. For instance, the restoration process can be conducted for luminance signals.

First, in step S401, the development unit 121 obtains the lens type information, the camera type information, and the capturing conditions (the aperture value, the focal length, the subject distance, and the like) from the tag information associated with the captured image data. Next, in step S402, the development unit 121 sets a restoration filter database (hereinafter referred to as restoration filter DB) corresponding to a combination of the lens type information, the camera type information, and the capturing conditions.

Figure 6A:
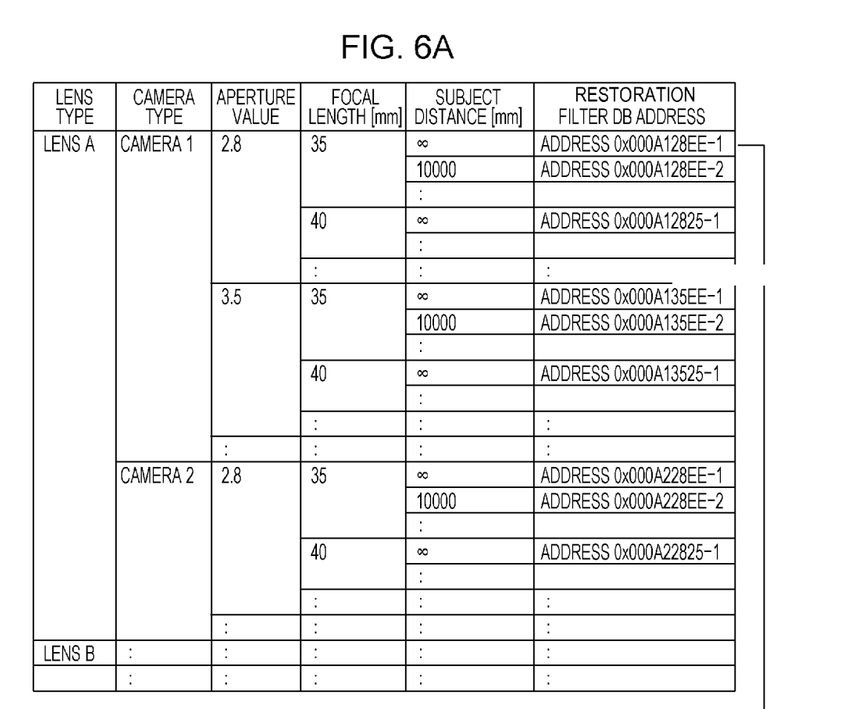
FIGS. 6A and 6B are illustrations of a method of storing a restoration filter DB.

FIG. 6A illustrates a table to set the restoration filter DB. This table stores a memory address for a restoration filter DB corresponding to the combination of (1) lens type, (2) camera type, (3) aperture value, (4) focal length, and (5) subject distance. Using the table in FIG. 6A, the development unit 121 obtains the memory address for restoration filter DB corresponding to the captured image data. The restoration filter DB is stored in the lens ROM 105 or the camera memory 117. The number of the restoration filter DB corresponds to the number of combination of the lens type information, the camera type information, and the capturing conditions. However, in order to reduce the memory size, the lens ROM 105 or the camera memory 117 can store a restoration filter DB corresponding to a plurality of the combinations in a bundle.

Figure 6B:
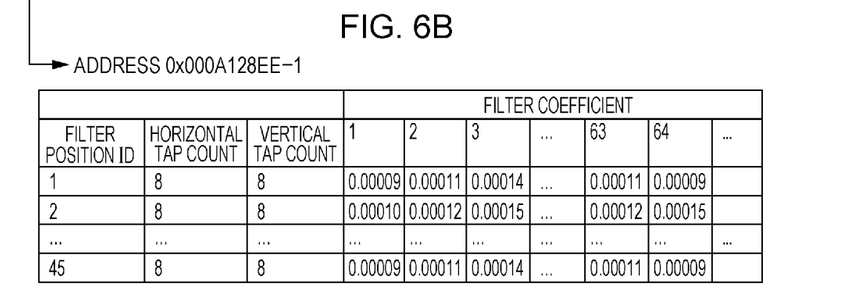

FIG. 6B illustrates an example of the restoration filter DB set in step S402. The restoration filter DB stores a plurality of representative filters, each of which is associated with a filter position ID. Filter coefficients of the representative filter vary depending on a pixel position in an image. The representative filter is identifiable based on the filter position ID.

Figure 5:
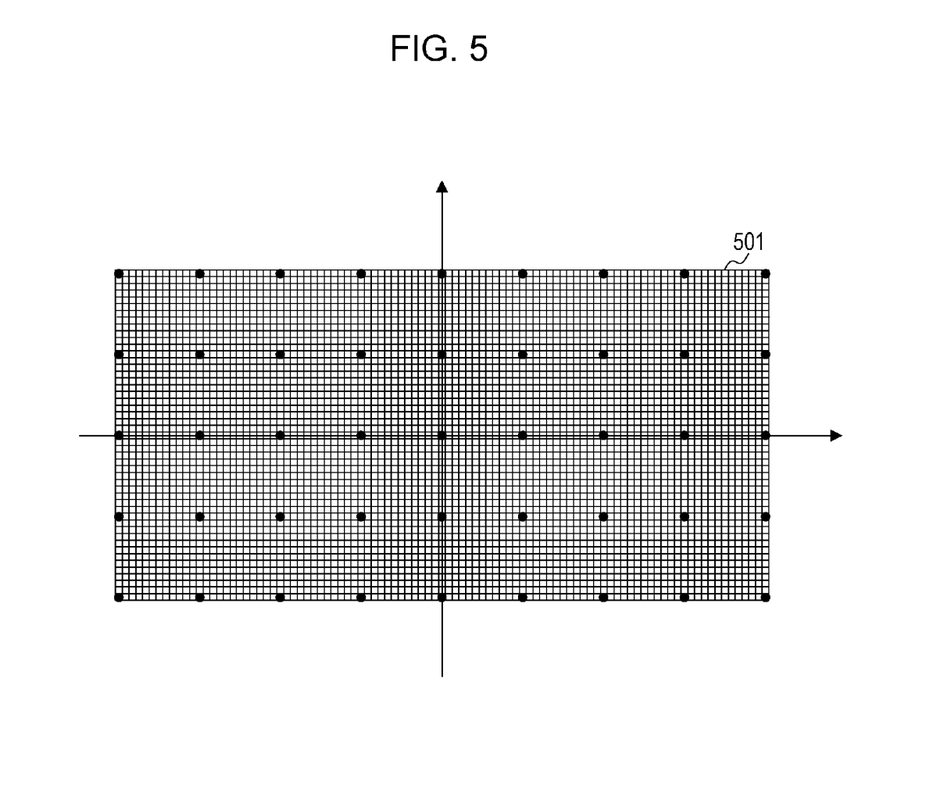
FIG. 5 is an illustration of a representative filter position for a restoration filter DB.

FIG. 5 is an illustration of a representative filter position for a restoration filter DB corresponding to a certain combination of the lens type information, the camera type information, and the capturing conditions. In FIG. 5, grid points in an image region 501 correspond to image pixels. Each of the representative filters stored in the restoration filter DB is associated with each of positions (hereinafter referred to as representative filter position) indicated by black dots in the image region 501 in FIG. 5. The representative filter positions are set at even intervals. The representative filter position can be identifiable based on the filter position ID in the table of FIG. 6B.

To reduce the computational cost for the restoration process which requires convolution integral, a size (number of taps) of the restoration filter should be reduced. Furthermore, in general, the image blur due to the aberration of the optical system is enlarged as the image height (distance from the center of the image) is higher. Therefore, the computational cost can be reduced by setting a number of tap at low image height position smaller than a number of tap at high image height position. Moreover, a number of tap in height can be different from a number of tap in width in consideration of a characteristic of an image blur due to the aberration of the optical system.

In conventional techniques, a vast amount of memory is required, since restoration filters are provided for all pixel positions in the image region 501. For instance, restoration filters for twenty million pixels are required, if an input image has twenty million pixels. Thus, in the first exemplary embodiment, restoration filters corresponding to all pixels are not stored. Instead, a limited number of representative filters are stored in a memory. In FIG. 5, the representative filter positions are set at even intervals, but these positions can be set at uneven intervals in consideration of a characteristic of an image blur due to the aberration of the optical system.

Next, in step S403, the development unit 403 initializes a pixel position of the pixel of interest. In the first exemplary embodiment, the pixel of interest is set at the top left corner in the image area 501 in the initialization step S403. Next, in step S404, the development unit 121 selects three representative filters from the restoration filter DB based on a positional relationship among the pixel position of the pixel of interest and the positions of representative filters defined in the restoration filter DB.

Figure 7A:
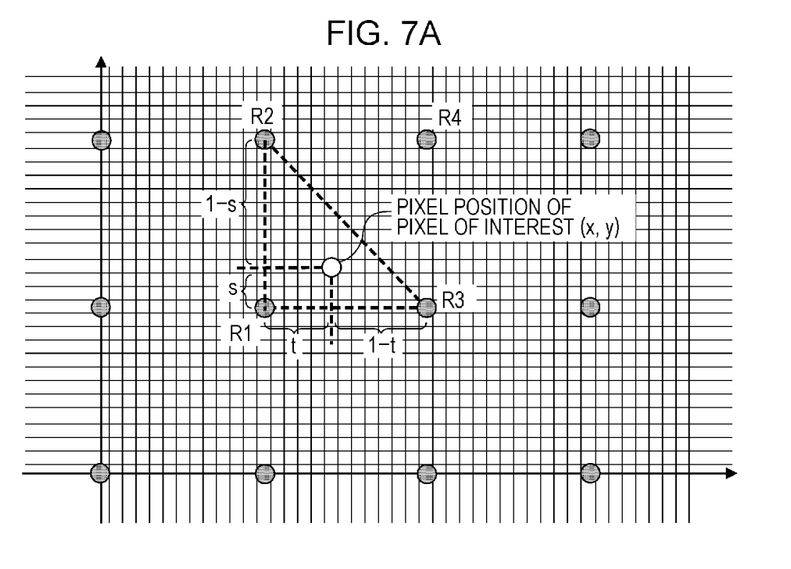
FIGS. 7A, 7B and 7C are illustrations of a method of selecting representative filters.

FIG. 7A illustrates a selection method in step S404. FIG. 7A depicts a part of the image region 501. There are four positions of representative filters (R1, R2, R3, and R4) which surround the pixel position of the pixel of interest $(x_i, y_j)$. It is known that the characteristic of the aberration of the optical system is symmetrical with respect to the optical center of the optical system. In consideration of this point symmetry, the representative filter positions are selected according to the following steps.

(Step 1) Select four candidate filter positions which surround the pixel position of the pixel of interest. This selection can be conducted by using upper bits of data indicating pixel position of the pixel of interest.

(Step 2) Select two candidate filter positions out of the four candidate filter positions selected in (Step 1) according to the rules below.

Select upper left and bottom right candidate filter positions if the pixel of interest lies in the first quadrant.
Select upper right and bottom left candidate filter positions if the pixel of interest lies in the second quadrant.
Select upper left and bottom right candidate filter positions if the pixel of interest lies in the third quadrant.
Select upper right and bottom left candidate filter positions if the pixel of interest lies in the fourth quadrant.

(Step 3) Select one of the candidate filter positions which is the closest to the optical center among the four candidate filter positions selected in (Step 1), if the pixel position of the pixel of interest is closer to the optical center than the line connecting two pixel positions selected in (Step 2). If not, select the candidate filter position farthest from the optical center.

(Step 4) Regard the two candidate filter positions selected in (Step 2) and the one candidate filter position selected in (Step 3) as the selected representative filter positions.

As above, the three representative filter positions are selected in consideration of the point symmetry with respect to the optical center.

Figure 7B:
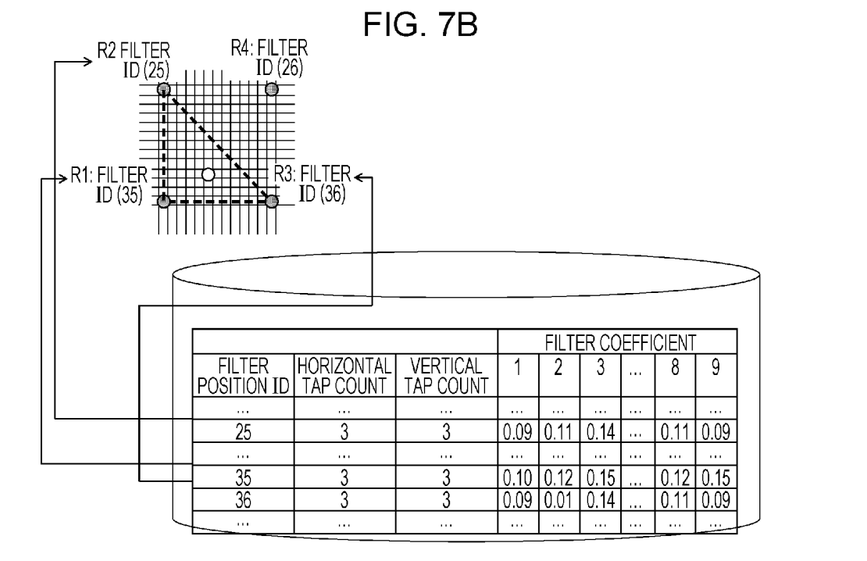

FIG. 7B illustrates the correspondence between the selected representative filters ($R_1$, $R_2$, and $R_3$) and the filter position IDs in the set restoration filter DB. The representative filter in the restoration filter DB can be identified by using the filter position IDs. Therefore, in FIG. 7B, the filters whose filter position IDs are 25, 35, and 36 are identified as the representative filters ($R_1$, $R_2$, and $R_3$).

Next, in step S405, the development unit 121 corrects the pixel value of the pixel of interest by applying each of three selected representative filters to the pixel value of pixel of interest and pixel values of peripheral pixels next to the pixel of interest. This correction enables to reduce the image blur at the position of pixel of interest.

Figure 7C:
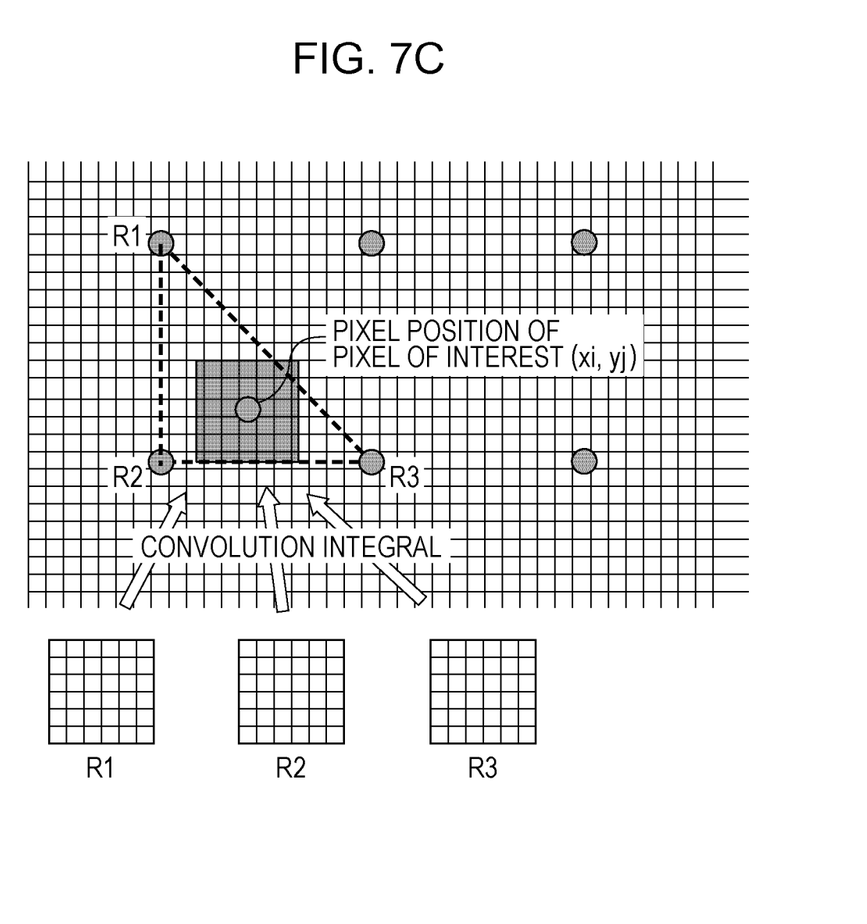

FIG. 7C is an illustration of the correction process in step S405. By applying the selected representative filters, the development unit 121 obtains three representative pixel values, $O_1$, $O_2$, and $O_3$. In particular, the three representative pixel values $O_1$, $O_2$, and $O_3$ are obtained by convolution integral operation described in Eq. (1), (2), and (3).

$$O_1 = p(x_i, y_j) * R_1(x_i, y_j) \tag{1}$$

$$O_2 = p(x_i, y_j) * R_2(x_i, y_j) \tag{2}$$

$$O_3 = p(x_i, y_j) * R_3(x_i, y_j) \tag{3}$$

$p(x_i, y_j)$ represents the pixel values of pixel of interest and peripheral pixel next to the pixel of interest. $R_1 (x_i, y_j)$, $R_2(x_i, y_j)$, and $R_3 (x_i, y_j)$ represents the selected representative filters selected in step S404. * denotes convolution integral operation. (i, j) represents a pixel position in an image region. In step S406, the development unit 121 calculates the corrected pixel value O' for the pixel of interest based on the positional relationship of three pixel positions of the selected representative filter positions and the pixel position of the pixel of interest. This calculation involves the weighted addition operation (interpolation operation) of the representative pixel values $O_1$, $O_2$, and $O_3$ as Eq. (4).

$$O'(x,y) = (1-t-s) \times O_1 + t \times O_2 + s \times O_3 \tag{4}$$

As shown in FIG. 7A, s represents an internal dividing ratio of the pixel of interest $(x_i, y_j)$ on the line segment between R1 and R2. And, t represents an internal dividing ratio of the pixel of interest $(x_i, y_j)$ on the line segment between R1 and R3. The internal dividing ratios s and t can be determined by using lower bits of data indicating pixel position of the pixel of interest.

As above, in the first exemplary embodiments, (i) a subset of representative filters are selected from the plurality of representative filters stored in the memory, (ii) each of the selected representative filters are applied to the pixel value of pixel of interest, and (iii) the pixel value of the pixel of interest is corrected based on (a) a result of the application of filters and (b) the pixel position of the pixel of interest. Therefore, the preferable blur correction onto the pixel of interest can be realized.

Next, in step S404, the development unit 121 decided whether the processes from step S404 to step S406 have been conducted for all pixels in the image. The development unit 121 concludes the restoration process if the processes have been conducted for all pixels. On the other hand, the pixel position of the pixel of interest is updated in step S408 if the processes from step S404 to step S406 have not been conducted for all pixels. The update of the pixel position of the pixel of interest can be performed in a scanline order in the image.

As mentioned above, the image blur due to the aberration of the optical system can be corrected without storing or generating restoration filters for all pixels in the image. Therefore, the first exemplary embodiment enables to reduce memory size requirement and computational cost. Also, the artifact to the switch of restoration filters can be reduced.

<Generation of Restoration Filter DB>

A method of generating a restoration filter to correct the image blur due to the aberration of the optical system using Point Spread Function (PSF) is described below.

(x, y) represents pixel position in an image and f(x, y) represents a pixel value at (x, y) captured by an ideal capturing apparatus whose optical system does not cause any image blur. g (x, y) represents a pixel value at (x, y) captured by an actual capturing apparatus whose optical system causes the image blur. h(x, y) represents PSF of the optical system. h(x, y) depends on the capturing conditions, such as the lens type, the camera type, the aperture value, the focal length, and the subject distance. f(x, y), g(x, y), and h(x, y) have the relationship described in the following equation.

$$g(x,y)=h(x,y)*f(x,y) \quad (5)$$

Eq. (5) is expressed in real space. Eq. (5) can be expressed in spatial frequency space by Fourier transforming as below.

$$G(u,v)=H(u,v)\cdot F(u,v) \quad (6)$$

H(u, v) is a spatial frequency space expression which is Fourier-transformed from h(u, v). H(u, v) is known as Optical Transfer Function (OTF). (u, v) is a coordinate in frequency space expression, that is, frequency. G(u, v) is a spatial frequency space expression which is Fourier-transformed from g(u, v). F(u, v) is a spatial frequency space expression which is Fourier-transformed from f(u, v). A blurred image can be corrected to a blur-free image by performing the division operation below.

$$F(u,v)=G(u,v)/H(u,v) \quad (7)$$

An ideal image f(x, y) where the image blur is reduced can be obtained by converting back F(u, v) to real space. Eq. (8) below represents this conversion.

$$f(x,y)=g(x,y)*R(x,y) \quad (8)$$

R(x, y) represents the inverse Fourier transform expression of the inverse number of H ($H^{-1}$). In the first exemplary embodiment, R(x, y) is stored as representative restoration filters at each representative filter position. As described in FIGS. 6A and 6B, each of the restoration filter DBs which includes filter coefficients of all representative filter positions is generated for a certain combination of capturing conditions of the image capturing apparatus.

A method of generating the representative restoration filters is not limited to the method above. The representative restoration filter can be Winner filter and the like.

<Correction Based on Saturated Region Ratio>

The pixel values (The signal values) may be saturated due to an over exposure, when the image capturing elements 111 converts light into the signals. At the saturated pixel, the information more than the saturation value will be lost. Therefore, the corrected value O' cannot be calculated correctly, if the saturated pixel value is used in Eq. (4).

Figure 8:
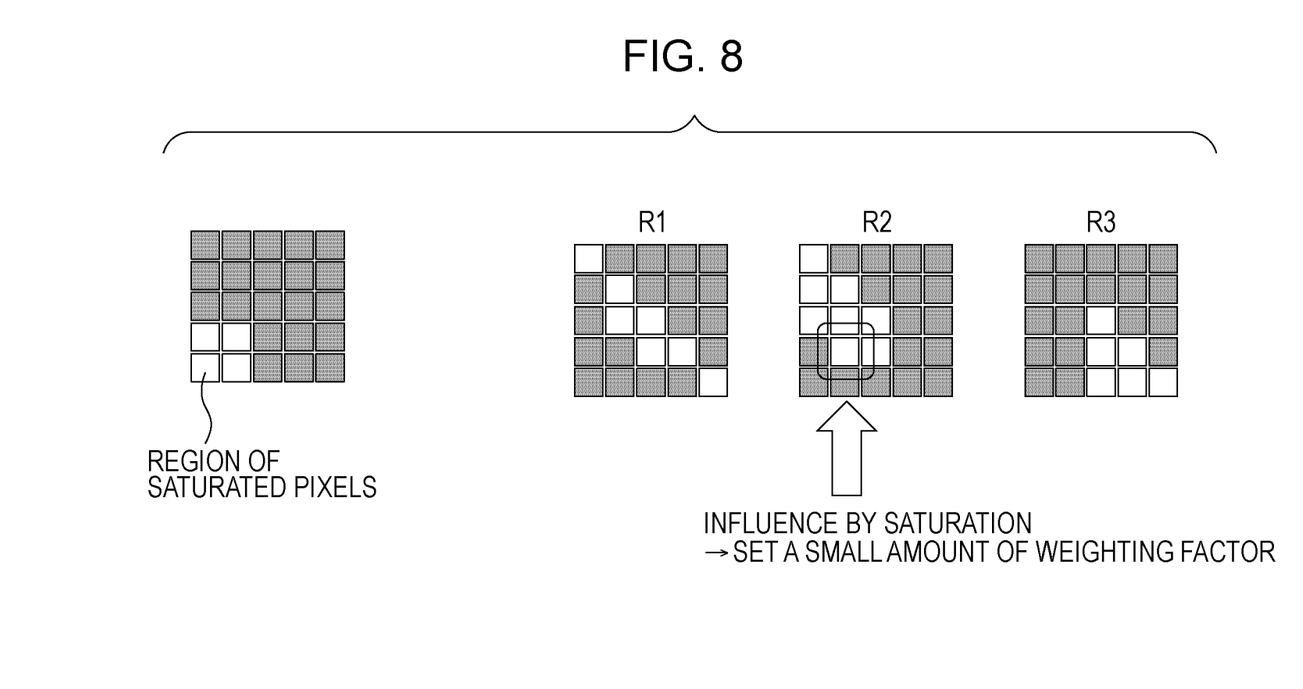
FIG. 8 is an illustration of saturated pixels.

FIG. 8 is an illustration of saturated pixels. Each representative restoration filter has an effective region where a filter coefficient is non-zero. Since the filter shapes of representative restoration filter are different, the effective regions are also different. In FIG. 8, each the representative restoration filter $R_1$, $R_2$, and $R_3$ has an effective region whose pixel count (effective region count) is 25. The saturated pixel count for the representative restoration filter $R_1$, $R_2$, and $R_3$ is 7, 8, and 6, respectively. A saturated region ratio is defined as Eq. (9).

$$\text{(Saturated region ratio)}=\text{(Saturated pixel count)}/\text{(effective region count)} \quad (9)$$

The saturated region ratio is calculated for each representative restoration filter.

Figure 9:
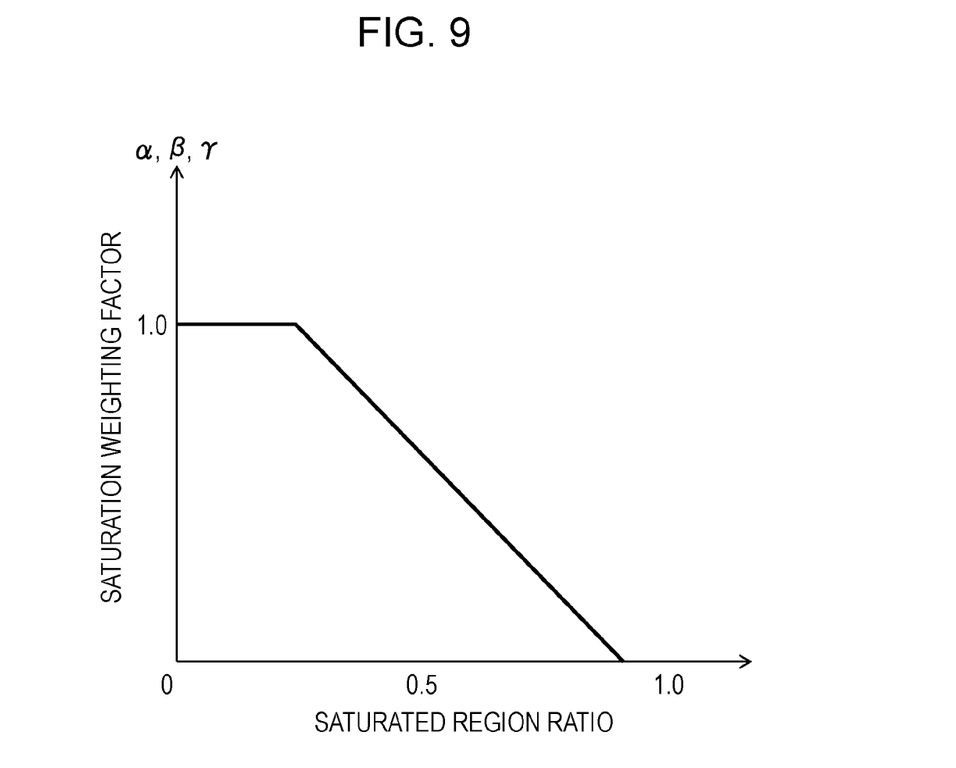
FIG. 9 is a graph with saturation weighting factor on the y-axis and saturated region ratio on the x-axis.

The saturated region ratio of the representative restoration filter $R_1$ in FIG. 8 is 7/25. The saturation weighting factor α, β, and γ are set for each of the saturated region ratio of $R_1$, $R_2$, and $R_3$. FIG. 9 is a graph with the saturation weighting factor on the y-axis and the saturated region ratio on the x-axis. In consideration of the saturation weighting factor, Eq (4) can be refined as Eq. (10).

$$O'(x,y)=(1-t-s)\cdot(\alpha\cdot(O1-O)+O)$$

$$t\cdot(\beta\cdot(O2-O)+O)$$

$$s\cdot(\gamma\cdot(O2-O)+O) \quad (10)$$

In short, the development unit 121 determines the pixel saturation in the effective regions of the representative restoration filters. Based on the result of the determination, the saturation weighting factor is determined to reduce the negative effect of pixel saturation. Therefore, the more precise image correction can be realized.

[Second Exemplary Embodiment]

In the first exemplary embodiment, the camera with interchangeable lenses is exemplified. In the second exemplary embodiment, all-in-one camera (e.g. compact camera) is exemplified.

Figure 10:
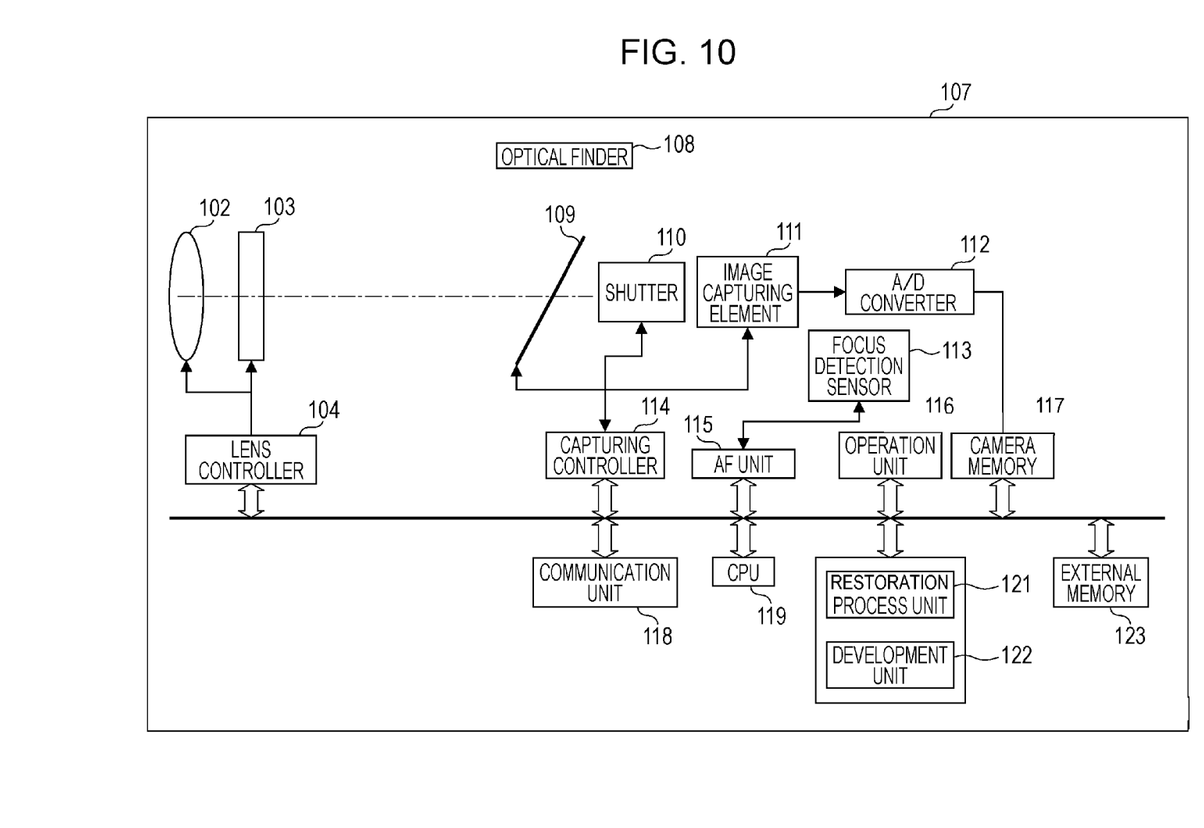
FIG. 10 is a block diagram illustrating an image capturing apparatus according to a second exemplary embodiment.

FIG. 10 is a block diagram illustrating an image capturing apparatus according to the second exemplary embodiment.

In FIG. 10, the lens 101 is built into the camera 107. Other than this, the embodiment is similar to the first exemplary embodiment. Using the system described in FIG. 10, the image restoration for an image which is captured by the all-in-one camera is realized.

[Third Exemplary Embodiment]

In the third exemplary embodiment, the restoration process is conducted in an image processing apparatus. The image data which is processed in the image processing apparatus is captured by an image capturing apparatus. The image data is a RAW image in the third exemplary embodiment.

Figure 11:
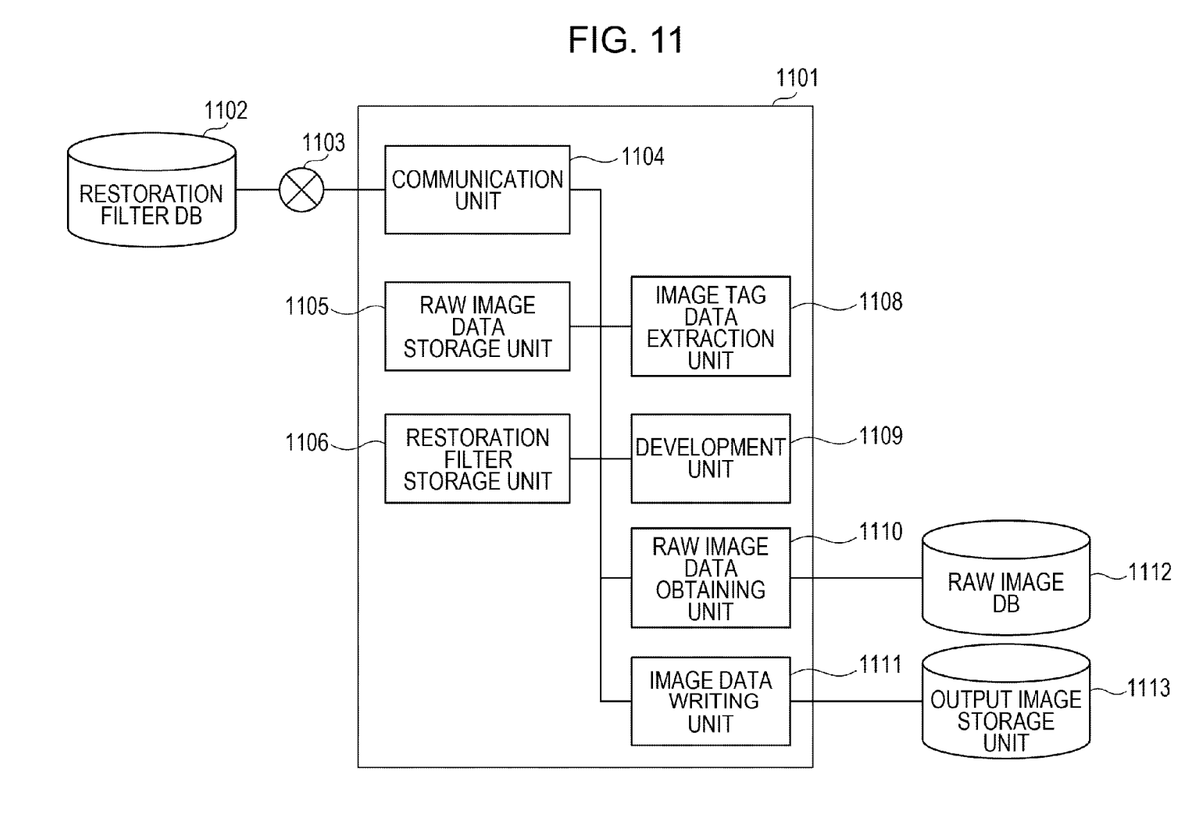
FIG. 11 is a block diagram illustrating an image processing apparatus according to a third exemplary embodiment.

FIG. 11 is a block diagram illustrating an image processing apparatus according to the third exemplary embodiment. The image processing apparatus 1101 is connected to a restoration filter DB server 1102 via communication network 1103, such as an Intranet and the Internet. A communication unit 1104 manages communication with the restoration filter DB server 1102 via the communication network 1103. A RAW image data storage unit 1105 stores RAW image data which is captured by an image capturing apparatus. A restoration filter storage unit 1106 stores a restoration filter DB. An image tag data extraction unit 1108 extracts capturing conditions, such as a focal length, an aperture value, and a subject distance from image tag information of the RAW image data.

A development unit 1109 executes a development process including a restoration process, a demosaicing process, a white balancing process, a Gamma correction process, a color conversion process, and a noise reduction process. A RAW image data obtaining unit 1110 obtains a RAW data from a memory of the image capturing apparatus or an external storage (e.g. RAW image DB 1112). An image data writing unit 1111 writes a developed image into a memory or an external storage (e.g. output image storage unit 1113). A RAW image DB 1112 stores RAW image data. An output image storage unit 1113 stores output images. Each unit in FIG. 11 executes respective process in collaboration with a Central Processing Unit (CPU) according to computer programs stored in a memory, a portable media (e.g. CD-ROM, DVD-ROM) and the like.

Figure 12:
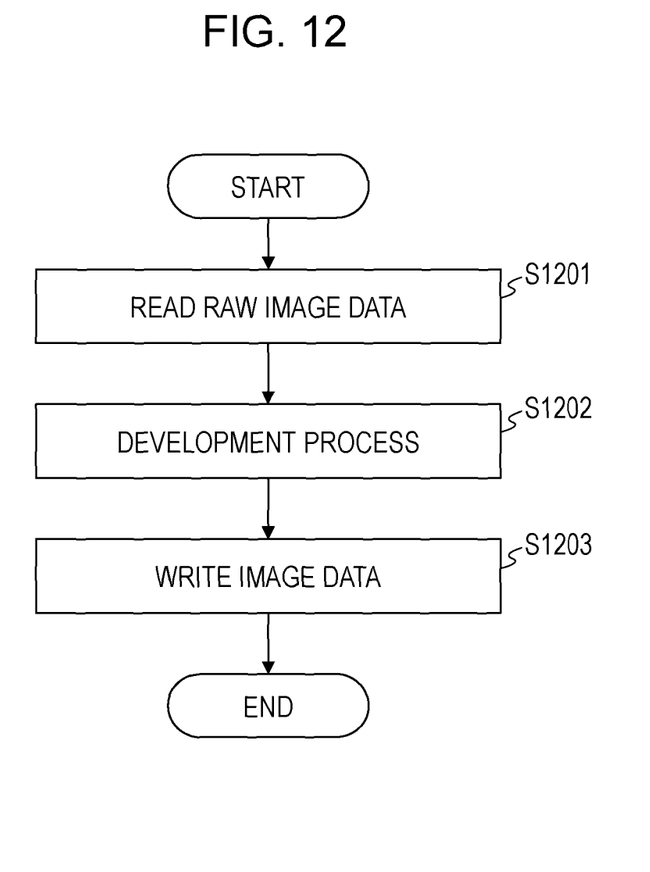
FIG. 12 is a flowchart illustrating an overall process according to a third exemplary embodiment.

FIG. 12 is a flowchart illustrating an overall process according to the third exemplary embodiment. First, in step S1201, the RAW image data obtaining unit 1110 obtains RAW image data stored in the RAW image DB 1112 and stores the obtained RAW image data in the RAW image data storage unit 1105. In step S1202, the development unit 1109 conducts the process including the restoration process described in the first exemplary embodiment using the obtained RAW image data and restoration filter DBs stored in the restoration filter storage unit 1106. Next, in step S1203, the image data writing unit 1111 outputs the restored image data to the output image storage unit 1113.

As described above, the restoration process can be realized in an image processing apparatus, such as a personal computer, and a portable device (e.g. a mobile phone).

The method described in the third exemplary embodiment can be applied to not only RAW image data, but to TIFF image data, or JPEG image data. In another example, the restoration filter DB may be stored in the image processing apparatus.

[Forth Exemplary Embodiment]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus, for correcting a blur due to an optical system of an image capturing apparatus, the image processing apparatus comprising:
   an obtaining unit configured to obtain a plurality of representative filters;
   a selection unit configured to select a subset of representative filters from the plurality of representative filters based on a pixel position of a pixel of interest in an image; and
   a correction unit configured to correct the pixel value of the pixel of interest based on (a) the selected representative filter and (b) the pixel position of the pixel of interest.

2. The image processing apparatus according to claim 1, wherein the filtering unit applies each of the selected representative filter to the pixel value of the pixel of interest and a pixel value of a peripheral pixel next to the pixel of interest.

3. The image processing apparatus according to claim 1, wherein the filtering unit obtains a plurality of representative pixel values by applying each of the selected representative filter to the pixel value of the pixel of interest, and
   wherein the correction unit corrects the pixel value of the pixel of interest by operating a weighting addition based on a positional relationship between each of filter position corresponding to the selected representative filter and the pixel position of the pixel of interest.

4. The image processing apparatus according to claim 1, wherein the selection unit selects the subset of representative filters from the plurality of representative filters based on a positional relationship between a pixel position corresponding to an optical center of the image capturing apparatus and the pixel position of the pixel of interest.

5. The image processing apparatus according to claim 1, wherein the selection unit selects the subset of representative filters from the plurality of representative filters based on a quadrant to which the pixel of interest belongs.

6. The image processing apparatus according to claim 1, further comprising an input unit configured to input a capturing condition of the image capturing apparatus,
   wherein the selection unit selects the subset of representative filters from the plurality of representative filters based on the pixel position of the pixel of interest and input capturing condition of the image capturing apparatus.

7. The image processing apparatus according to claim 1, further comprising a determining unit configured to determine whether the pixel of interest and/or a pixel value of a peripheral pixel next to the pixel of interest is saturated or not,
   wherein the correction unit corrects the pixel value of the pixel of interest based on (a) the result of the application of filters by the filtering unit, (b) the pixel position of the pixel of interest, and (c) a result of the determination by the determination unit.

8. The image processing apparatus according to claim 1, wherein each of the representative filters is independent of a pixel value of the image.

9. An image processing method, for correcting a blur due to an optical system of an image capturing apparatus, the image processing method comprising:
   obtaining a plurality of representative filters in a memory;
   selecting a subset of representative filters from the plurality of representative filters based on a pixel position of a pixel of interest in an image; and
   correcting the pixel value of the pixel of interest based on (a) the selected representative filter and (b) the pixel position of the pixel of interest.

10. A non-transitory computer-readable storage medium retrievably storing computer-executable process steps for performing a method for correcting a blur due to an optical system of an image capturing apparatus, the method comprising:
   obtaining a plurality of representative filters in a memory;
   selecting a subset of representative filters from the plurality of representative filters based on a pixel position of a pixel of interest in an image; and
   correcting the pixel value of the pixel of interest based on (a) the selected representative filter and (b) the pixel position of the pixel of interest.

* * * * *